United States Patent [19]
Clatanoff et al.

[11] Patent Number: 5,409,968
[45] Date of Patent: * Apr. 25, 1995

[54] CONTROLLED CONDUCTIVITY ANTISTATIC ARTICLES

[75] Inventors: William J. Clatanoff, Austin, Tex.; Craig S. Chamberlain, Woodbury, Minn.

[73] Assignee: Minnesota Mining and Manufacturing Company, St. Paul, Minn.

[*] Notice: The portion of the term of this patent subsequent to Aug. 3, 2010 has been disclaimed.

[21] Appl. No.: 972,598

[22] Filed: Nov. 6, 1992

[51] Int. Cl.$^6$ .............................................. C08K 9/02
[52] U.S. Cl. ........................... 523/204; 524/431; 524/441; 524/449; 524/494; 524/496; 428/323; 428/379
[58] Field of Search ............... 523/204; 524/431, 441, 524/449, 494, 496; 428/323, 379

[56] References Cited

U.S. PATENT DOCUMENTS

| | | | |
|---|---|---|---|
| 3,365,315 | 1/1968 | Beck et al. | 106/40 |
| 3,563,916 | 2/1971 | Takashima et al. | 252/511 |
| 3,576,378 | 4/1991 | Hilmanowski | 417/366 |
| 3,836,482 | 9/1974 | Ling et al. | 252/511 |
| 4,175,152 | 11/1979 | Carnahan et al. | 428/242 |
| 4,271,045 | 6/1981 | Steigerwald et al. | 252/511 |
| 4,288,352 | 9/1981 | Weiss et al. | 524/322 |
| 4,373,013 | 2/1983 | Yoshizumi | 428/570 |
| 4,391,646 | 7/1983 | Howell | 106/97 |
| 4,431,764 | 2/1984 | Yoshizumi | 524/409 |
| 4,579,882 | 4/1986 | Kanbe et al. | 523/137 |
| 4,612,242 | 9/1986 | Vesley et al. | 428/313.9 |
| 4,618,525 | 10/1986 | Chamberlain et al. | 428/209 |
| 4,634,865 | 1/1987 | Conway | 250/288 |
| 4,875,581 | 10/1989 | Ray et al. | 206/328 |
| 4,898,771 | 2/1990 | Havens | 428/316 |
| 5,216,204 | 6/1993 | Dudek et al. | 174/102 SC |
| 5,232,775 | 8/1993 | Chamberlain et al. | 428/323 |

OTHER PUBLICATIONS

U.S. Ser. No. 07/94/868.

Primary Examiner—Paul R. Michl
Assistant Examiner—John J. Guarriello
Attorney, Agent, or Firm—Gary L. Griswold; Walter N. Kirn; Darla P. Neaveill

[57] ABSTRACT

The invention provides semi-conductive, static dissipative polymeric composites comprising:
  a) an insulative polymeric resin, and
  b) from about 5 to about 35 volume percent of at least one high aspect ratio filler having a thin-film inorganic layer of from about 10 Å to about 1000 Å of a highly conductive metal and an overlayer of an insulative metal oxide, said layer having an average coating thickness of from about 2 Å to about 200 Å, the composites having volume resistivities of from about $1 \times 10^4$ ohm-cm to about $1 \times 10^{11}$ ohm-cm.

9 Claims, 1 Drawing Sheet

CONTROLLED CONDUCTIVITY ANTISTATIC ARTICLES

BACKGROUND OF THE INVENTION

The invention relates to electrostatic dissipative polymeric composites having controlled conductivity. More specifically, the invention concerns static-dissipative polymeric composites consisting of an insulative polymeric based resin and an electrically active filler to make the resultant composition semi-conducting.

DESCRIPTION OF THE RELATED ART

Traditional electrically active plastic composites use highly conductive fillers, such as particles, fibers or flakes in an insulative polymeric base resin. Commonly employed electrically active fillers include carbon powder, carbon fiber, metal powders, fibers and flakes, and metallized particles, fibers and flakes. These are disclosed in multiple patents, e.g., U.S. Pat. Nos. 4,634,865, and 4,288,352.

The filler must be used in an adequate volume concentration or "loading" for the individual particles or fibers to be in electrical contact in order for the resulting composite to be electrically conductive. The level of conductivity depends on the number of conductive paths created by the particles or fibers. Low levels of filler are ineffective, because there are few conductive paths. Therefore, to increase conductivity, the amount of filler must be increased. These techniques work well for composites in the conductive range (volume resistivity of $10^1$–$10^4$ ohm-cm) as this range falls in a region for highly conductive fillers where a small change in filler concentration has little effect on the conductivity of the composite because so many conductive paths exist.

However, using these highly conductive fillers to obtain composites in the semi-conducting range (volume resistivity of $10^4$–$10^{11}$ ohm-cm) causes problems. For fillers of high conductivity, this range typically falls into a region where a small change in filler loading causes a large change in the conductivity of the composite. This makes the conductivity very difficult to control. This sensitive balance between the conductive filler and the insulative resin is further complicated by processing variations such as polymer/fiber orientation, density, shear rates and cooling rates.

Composites using highly conductive fillers also typically suffer from other detrimental characteristics:

In composites utilizing conductive fillers with a relatively high aspect ratio, i.e., fibers or flakes, the ratio of conductive filler to insulating polymer must be relatively low to control the number of connections. This results in greatly reducing the probability of providing a "ground" or an electrical path for a static charge to dissipate through.

In composites utilizing conductive powder fillers, e.g., carbon powder, as disclosed in U.S. Pat. Nos. 3,563,916 and 3,836,482, the composite exhibits "sloughing" where the powder filler rubs off, coming out of the polymeric matrix.

In composites utilizing metals as the conductive filler, i.e., metal powders, fibers and flakes, as disclosed in U.S. Pat. No. 3,576,378, the metal particles are very dense compared to the polymer matrix and thus tend to separate from the matrix during processing resulting in a non-homogenous composite.

In composites utilizing conventional metallized particles, i.e., microspheres, microbubbles, fibers and flakes, the material coating is typically limited to solution processing techniques or "plating" where the coatings are relatively thick and expensive. Solution processing techniques generally limit the materials to those with high conductivities thereby yielding composites conductive rather than semi-conductive. In addition, plating technology has metal adhesion problems where the metal plating nodules pull away and separate from the host particle.

It has now been discovered that a high aspect ratio filler such as a fiber or a flake having thereon a thin layer of a high conductivity metal, having thereover a layer of an insulative oxide, can be used at lower loadings with an insulative resin to provide a semi-conductive composite.

It is especially surprising that the thin coating of insulative oxide will modify the electrical conductivity of the highly conductive metal to the extent that a semi-conductive composite can be obtained wherein the conductivity is well controlled.

Inorganic thin-film coating of metals onto particulate matter is known for a variety of purposes. U.S. Patent Nos. 4,618,525, and 4,612,242, discloses glass microbubbles coated with a variety of metal oxides. Use of such bubbles as pigmenting fillers in pressure-sensitive adhesive tapes is disclosed. Electrical properties are not disclosed, nor is the use of such microbubbles as fillers in a static dissipative polymer.

Commonly used techniques to achieve controlled semi-conducting plastic composites consist of the incorporation of a semi-conducting material such as metal oxides (e.g., copper oxide) in particulate form into plastics. The particles are difficult to disperse and much denser than plastics resulting in heavy and expensive semi-conducting plastic composites.

Other controlled conductivity coated particles for anti-static plastics have been described in U.S. Pat. Nos. 4,373,013 and 4,431,764. These are titanium dioxide particles coated with antimony tin oxide. Again, these particles are difficult to disperse and much denser than plastics resulting in heavy and relatively expensive semi-conductive plastic composites. Further, the particles disclosed to be useful have an average particle size of $0.07\mu$ to $0.14\mu$.

U.S. Pat. No. 4,271,045, discloses an electrically conductive layer comprising a mixture of minute particles of semi-conductive material obtained through pyrolysis of a carbon-containing compound coated or doped with one or more Group III-VIII elements.

U.S. Pat. No. 4,175,152 discloses polymeric materials containing semiconducting pyropolymeric inorganic refractory oxide material having resistivity of from about 0.001 to about $10^{10}$ ohm-cm.

U.S. Pat. No. 4,579,882 teaches that when particles are coated with a thick metal coating and placed in a binder, the conductivity of the composite is very high.

SUMMARY OF THE INVENTION

The invention provides semi-conductive, static dissipative polymeric composites comprising:
a) an insulative polymeric resin, and
b) from about 5 to about 35 volume percent of at least one high aspect ratio filler having thereon a thin-film inorganic layer of from about 10 Å to about 1000 Å of a highly conductive metal and an overlayer of an insulative metal oxide, said layer having an average coating thickness of from about 2 Å to about 200 Å,
the composites having volume resistivities of from about $1 \times 10^4$ ohm-cm to about $1 \times 10^{11}$ ohm-cm.

Preferred semi-conductive, static-dissipative, polymeric composites comprise a) an insulative polymeric resin, and
b) from about 5 to about 35 volume percent of a glass filler having a high aspect ratio having thereon an inorganic layer from about 10 Å to about 1000 Å of a highly conductive metal selected from the group consisting of stainless steel and aluminum, and an overlayer of an insulative metal oxide layer, said layer having an average coating thickness of from about 2 Å to about 200 Å the composites having volume resistivities of from about $1 \times 10^4$ ohm-cm to about $1 \times 10^{11}$ ohm-cm.

As used herein, the following terms have these meanings.

1. The term "thin-film" coating means a coating of at least about 1 Å to about 1000 Å.
2. The term "high aspect ratio" means an aspect ratio of greater than 1.
3. The term "low loading" means a volume percentage of less than about 35%.

Figure 1:
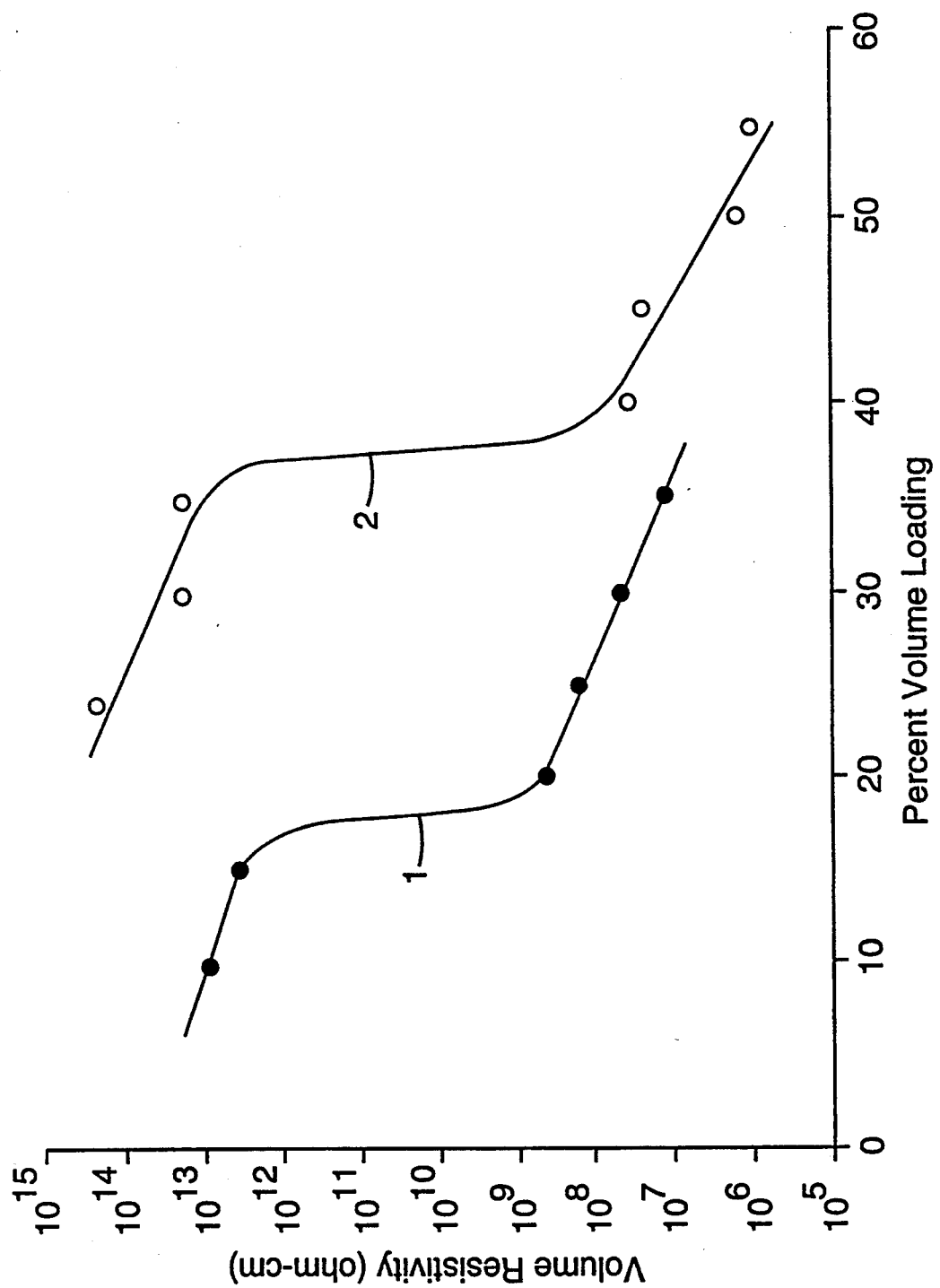
FIG. 1 is a graph showing the electrical resistivity as a function of various volume loadings of particulate fillers.

Curve #1 is that of stainless steel coating glass fibers dispersed in a polysulfone/polycarbonate blend matrix. The electrical resistivity stays within the static dissipative range over a broad range; concentrations of 20 volume percent up to 35 volume percent are shown here. The onset of electrical percolation occurs at a volume loading of 20% for the coated fibers.

Curve #2 is that of stainless steel coated microspheres dispersed in the polystyrene. As can be seen, the loading of microspheres required to achieve the onset of electrical percolation is much higher, 40% by volume is required. The identity of the polymer does not significantly affect the volume loading at which electrical percolation begins.

DETAILED DESCRIPTION OF THE INVENTION

The invention is a semi-conducting plastic composite consisting of high aspect ratio metal-coated filler material and an insulative base resin resulting in controllable electrical properties in the range of $10^4$–$10^{11}$ ohm-cm volume resistivity. In addition, the composite exhibits excellent groundability to dissipate any electrical charge and can be lightweight.

Useful insulative polymeric resins in composites of the invention include, but are not limited to thermosets such as epoxies, urethanes, and thermoplastics such as polyesters, polycarbonates, polysulfones, polyethers, such as polyether sulfone, and polyolefins such as light, medium and high density polyethylene, ethylene-propylene copolymer, either random or block configuration, polypropylene-maleic acid anhydride, polystyrene, styrene-acrylonitrile copolymer, acrylonitrile-butadiene-styrene, poly(methyl methacrylate), ethylene vinyl acetate, ethylene-acrylic acid copolymer, vinyl chloride-polypropylene copolymers, polyisobutylene, polybutadiene, and crosslinked polyethylene, whether chemically, thermally or E-beam crosslinked, and polyphenylene sulfide, polyetheretherketone, polyetherimide, polyarylsulfone and polypropylene oxide modified polyether sulfones.

The high aspect ratio particulate fillers useful in articles of the invention include fibers, flakes, rods, tubes and the like. These fillers may be solid or hollow and may be formed of glass, carbon, mica, clay, polymers, and the like. The use of such fillers allows a smaller volume percentage to be used in the final article while maintaining controlled conductivity. This is in contrast to spheroidal fillers, e.g., microbubbles, which require substantially higher volume loadings in order to provide effective electrical and antistatic characteristics. Further, high aspect ratio fillers also strengthen the polymeric matrix, providing improved physical properties while providing a conductive network.

The high aspect ratio fillers have coated thereon a thin-film layer of a highly conductive metal, e.g., 10 Å to about 1000 Å, overlaid with an extremely thin layer of a insulative metal oxide, i.e., having an average coating thickness of from about 2 Å to about 200 Å. Because the metal oxide layer is extremely thin, it may not always be coated evenly; in fact, discontinuities may occur where the layer is thinnest. This layer reduces the high conductivity of the metal, and along with the proper selection of the volume loading of the filler, provides the semi-conductive properties of the articles of the invention. This layer may be formed by the introduction of oxygen during or subsequent to the coating of the conductive metal layer or it may be separately coated thereon.

Surprisingly, this combination of layers imparts excellent semi-conducting properties with the use of very small amounts of the filler. Preferred articles contain fillers having coated thereon stainless steel or aluminum.

The conductivity of semi-conducting plastic composites can be controlled by both the intrinsic conductivity of the filler material and the concentration of the filler in the insulative polymeric base resin.

In designing a static-dissipative polymeric composite for a particular application, one can select the base resin and filler system to meet the desired physical, mechanical and thermal requirements of the application. The specific semi-conducting coating, and the thickness can be selected to "dial-in" the desired electrical properties of the composite. This gives the ability to design mechanical and physical properties, and processability by selecting the particulate form of the filler, (e.g. fiber, or flake), rather than the particulate form being dictated by the type of filler used to impart electrical properties as is the case with conventional electrical composites.

The coated particulate fillers are typically made by physical vapor deposition, e.g., by sputtering or by vapor coating. Electroless plating, chemical vapor deposition and other conventional coating techniques could also be useful, although such processes are not preferred.

The coated particulate fillers may also have a surface treatment thereon, e.g., a free-flow agent, or the like. Exemplary of these types of surface treatments are organosilanes such as dimethyoxypropyltrimethoxysilane and the like. Organosilanes are available as Silane Coupling Agents from Union Carbide, Danbury, Conn.

TEST METHODS

Measuring Electrical Conductivity of Coated Particles

The powder volume resistivity was measured using the following procedure. The test cell consisted of a Delrin TM block containing a cylindrical cavity with circular cross section of 1.0 cm². The bottom of the cavity was covered by a brass electrode. The other electrode was a 1.0 cm² cross section brass cylinder which fitted into the cavity. The powder to be tested was placed in the cavity, then the brass cylinder inserted. A weight was placed on top of the brass cylinder to exert a total pressure of 124 kiloPascals (18 psi) on the powder. The electrodes were connected to a digital multimeter to measure resistance. When the powder bed was 1.0 cm high the observed resistance was equivalent to the powder resistivity.

Calculating Particle Coating Thickness

The surface area of each type of particle was determined using the BET surface area method. The weight percent of metal on each type of particle was determined by dissolving portions of the coated particles in dilute hydrofluoric acid in combination with nitric, hydrochloric, or sulfuric acid as appropriate. The resulting solutions were analyzed by inductively coupled argon plasma atomic emission spectroscopy to obtain the weight percent metal on the particles. The thickness of the conductive coating on the particle was estimated using the following relationship:

$$\text{Coating thickness (Å)} = \frac{10{,}000 \times \frac{\text{Wt \% metal}}{100 - \text{Wt \% metal}}}{\text{Surface area (m}^2\text{/g)} \times \text{Coating density (g/cm}^3\text{)}}$$

Preparing Filled Plastics for Conductivity Testing

Coated particles were blended into polystyrene using the following procedure.

A Haake "Rheocord System 40" made by Haake-Buckler fitted with a "Rheomix" model 600 mixing head was set to a process temperature of 180° C. Polystyrene pellets were added. These were Styron TM 498 polystyrene obtained from Dow Chemical, Midland, Mich. These were allowed to melt, then mixed for three minutes at 20 rpm. Coated particles were then added. Enough material was added to charge 80% of the container volume (about 48 cm³). The mixing speed was increased to 40 rpm. Mixing was carried out for seven minutes. The composite material was then removed from the chamber.

The composite material was placed between two flat aluminum plates lined with release liners. One millimeter thick spacers were also placed between the plates. This was placed in a Carver press fitted with heated platens. The temperature was set so as to melt the composite. Pressure was slowly applied so that a sheet of 1 mm thickness was obtained. This was allowed to cool, then removed from between the plates. This was then tested for volume resistivity.

Other polymers can also be blended with coated particles according to the above procedure. One skilled in the art would be able to vary mixing time, and the like, as required.

Measuring Electrical Resistivity of Composite Sheets

The volume resistivity of the particle filled composite was measured in a manner similar to ASTM D257. A flat sheet of the composite, 1 mm thick was sandwiched between two aluminum foil electrodes. One electrode was smaller in diameter than the sheet and the other electrode was about the same size. Exact diameter of the electrodes is not critical as volume resistivity is geometry independent. Nonconductive foam sheets were placed both on top and under the electrodes, then this was sandwiched between two flat metal plates. Moderate pressure was applied to ensure good contact between the foil electrodes and the plastic. A General Radio type 1644A Megohm bridge was connected to the two electrodes. A potential of 50 volts was applied across the electrodes. The resistance was measured after the voltage had been applied for 60 seconds. The volume resistivity was calculated from the formula:

$$\text{Volume resistivity (ohm-cm)} = \frac{\text{Resistance (ohms)} \times \text{Electrode area (cm}^2\text{)}}{\text{Sheet thickness (cm)}}$$

The aluminum foil electrodes were removed from the above composite sheet. The surface resistivity was measured using a "Voyager Model SRM-110" surface resistivity meter from Pinion Corporation.

EXAMPLES

Example 1

This example demonstrates that a thin stainless steel coating on glass fibers having a thin insulating oxide formed on its surface, makes the particles semiconducting rather than conducting.

Glass fibers available as Fiberglas TM "Milled Fibers 731ED 1/32 inch" were obtained from Owens-Corning, Toledo, Ohio. The fibers were 15.8 microns in diameter. They had an aspect ratio distribution range of 1 to 40 with a number based average of 12 based on photomicrograph analysis. The fibers were coated with 73 Å of stainless steel in the following manner. The fibers (1300 grams, 2 liters) were placed into a vacuum chamber. The chamber was evacuated to a pressure of $1.3 \times 10^{-5}$ torr, then backfilled with 3 millitorr argon sputtering gas. Stainless steel was then sputter-deposited onto the fibers as they were slowly tumbled. The sputtering target was a water-cooled rectangular target made of 304 stainless steel, $12.7 \times 20.3$ cm in size. The cathode was operated in the dc magnetron mode at a power of 2.0 kilowatts with a resultant cathode potential of 592-643 volts and current of 3.1-3.4 amperes. The total coating time was 244 minutes. The resultant material had a weight percent iron of 0.61%, this figure already being corrected for the 0.20% iron in the glass fibers. The 304 stainless steel is 71% wt/wt iron, so that the weight percent stainless steel is 0.86 percent. The bulk powder resistivity was 27 ohm-cm.

The coated fibers were blended into Mindel TM S1000, a modified polysulfone resin from Amoco at 23% loading by volume using the method described above. This composite material was hot-pressed into a sheet one millimeter thick which had a volume resistivity of $3.8 \times 10^8$ ohm-cm at 50 volts applied potential and a surface resistivity of $10^8 - 10^9$ ohms/square.

Example 2

This example demonstrates the electrical percolation onset with increasing volume loading of coated fibers in the polymer matrix.

The stainless steel coated glass fibers from Example 1 were dispersed at various volume loadings into Mindel TM S1000. These were pressed into composite sheets as in Example 1 and the volume resistivities measured. The results are shown in FIG. 1 as curve #1. Above a volume loading of about 20%, the material is in the desired static dissipation range. This is relatively insensitive to volume loading compared to conventional fillers such as carbon fibers. As a result volume loading can be adjusted to control shrink rate during molding and static dissipation is more efficient because there are more conductive pathways in the material.

Example 3

This example demonstrates that aluminum can be an effective coating to impart semiconductivity to a composite when a thin insulating oxide is formed on its surface.

Glass fibers available as Fiberglas TM "Milled Fibers 739DD 1/16 inch" were obtained from Owens/Corning, Toledo, Ohio. The fibers had an aspect ratio distribution range of 1 to 41 with a number based average of 6. These were coated with 313 Å of aluminum. This was done as described in Example 1, under the following conditions. An aluminum target was used to sputter onto 672 grams of the fibers. The sputtering gas was argon at a pressure of 2.4 millitorr. The cathode was at a power of 5.0 kilowatts with a resultant cathode potential of 523–572 volts and current of 8.7–9.6 amperes. The total coating time was 244 minutes. The resultant material had a bulk powder resistivity of approximately 0.2 ohm-cm. The weight percent aluminum was estimated at 1.25% based on deposition conditions. This is necessary since the glass fibers have 13–16% aluminum oxide. This makes difficult an accurate determination of the much smaller amount of aluminum associated with the coating.

High impact polystyrene available as Styron TM 49827W was obtained from Dow Chemical Company, Midland, Mich. The coated fibers were blended into the polystyrene at 24% loading by volume using the method described above. The composite material was pressed into a sheet one millimeter thick which had a volume resistivity of $1.5 \times 10^6$ ohm-cm at an applied potential of 50 volts and a surface resistivity of $10^5$ ohms per square.

Comparative Example C4

This example demonstrates that a metal coating without an insulating oxide is too conductive to impart semiconductivity to the composite by the method of this invention. Silver will not form an oxide which is an effective insulator, so the silver coated particle and its composite is too conductive.

Glass fibers available as Fiberglas Milled Fibers 739DD 1/16" were coated with 417 Å of silver. This was done as described in Example 1, under the following conditions. A silver target was used to sputter onto 671 grams of fibers. The cathode was operated at a power of 2.0 kilowatts with a resultant cathode potential of 627–649 volts and current of 3.0–3.2 amperes. The total coating time was 210 minutes. The resultant material had a weight percent silver of 6.16% and a bulk powder resistivity of less than 0.1 ohm-cm.

A test slab 1 mm thick was made of 24% v/v of the coated fibers in Devcon 5 minute epoxy. This gave a volume resistivity of less than 100 ohm-cm. This is outside the desired static dissipative range.

Example 5

This example demonstrates that other high aspect ratio particles can be effective when coated in the manner of this invention. Stainless steel coated mica flakes dispersed in epoxy provide the right semiconductivity.

Phlogopite mica flakes available as Suzorite mica 200HK were obtained from Marietta Resources International, Ltd., Hunt Valley, Md. The aspect ratio of these mica flakes was in the range of 30–70. These flakes were coated with 29 Å of stainless steel. This was done as in Example 1, under the following conditions: A 304 stainless steel target was used to sputter-deposit onto 540 grams of mica flakes. The cathode was operated at a power of 7.0 kilowatts with a resultant cathode potential of 710–820 volts and current of 8.5–9.9 amperes. The total coating time was 273 minutes. The resultant material has an estimated weight percent stainless steel of 6.1 and had a bulk powder resistivity of 20 ohm-cm. The weight percent stainless steel is estimated from the deposition conditions because mica has a large iron oxide concentration. This makes difficult an accurate determination of the relatively small amount of iron associated with the coating.

A test slab 1 mm thick was made of 15% v/v of the coated mica in Dercon TM 5 minute epoxy. This composite material gave a volume resistivity of $1.4 \times 10^9$ ohm-cm at 50 volts. Samples made at other volume loadings show that the onset of electrical percolation is at about 15% v/v.

Example 6

This example demonstrates that a high temperature resin such as polyethersulfone (PES) can be used as an antistatic material when filled with coated high aspect ratio fillers according to the invention.

Glass fibers, available as Fiberglas TM "Milled Fibers 739DD 1/16 inch" were coated with 689 Å of stainless steel. This was done as described in example 1 under the following conditions. A 304 stainless steel target was used to sputter-deposit onto 672 grams of the fibers. The cathode was at a power of 6.0 kilowatts with a resultant cathode potential of 800–989 volts and a current of 6.6–7.5 amperes. The total coating time was 666 minutes. The resultant material had a weight percent iron of 5.42%, including the 0.20% from the fiber core and a bulk powder resistivity of 1 ohm-cm.

PES, available as Victrex TM 3600 G was obtained from ICI, Wilmington, Del. The coated fibers were blended into the PES at a volume loading of 20% v/v. This composite material was hot-pressed into a sheet one millimeter thick. This had a volume resistivity of $3.8 \times 10^5$ ohm-cm at an applied potential of 50 volts and a surface resistivity of $10^5$ ohms per square.

EXAMPLE 7

This Example demonstrates the use of a metal oxide coating on the high-aspect ratio particulate wherein the metal oxide comprises a different metal than that metal of the conductive coating. Insulating aluminum oxide was deposited onto a conductive silver coating on glass fibers.

The silver coated glass fibers of Example C4 were coated with 110 Å of aluminum oxide. This was done as described in example 3 with the following conditions set. An aluminum target was used to sputter onto 100 grams of the silver coated fibers; the cathode was at a power of 2.00 kilowatts with a resultant cathode potential of 510–547 volts, and a current of 3.6–3.9 amperes. The total coating time was 120 minutes.

During the coating process, oxygen gas was added to the chamber in the vicinity of the particles at a rate of 8.0 standard cubic centimeters per minute. The resultant material had a bulk powder resistivity of 50 ohm/cm. Compare this with the bulk powder resistivity of the silver coated glass fibers, prior to coating which was less than 0.1 ohm/cm. The weight percent aluminum was estimated at 0.3% based on deposition conditions.

A test slab 1 mm thick was made of 24% v/v of the coated fibers in Devcon ™ 5 minute epoxy. This composite material gave a volume resistivity of $1.6 \times 10^5$ ohm-cm.

What is claimed is:

1. A semi-conductive, static-dissipative polymeric composite comprising:
   a) an insulative polymeric resin, and
   b) from about 5 to about 35 volume percent of at least one filler having an aspect ratio of from about 1 to about 100, bearing thereon about 1000 Å of a highly conductive metal and an overlayer of an insulative metal oxide, said layer having an average coating thickness of from about 2 Å to about 200, the composites having volume resistivities of from about $1 \times 10^4$ ohm-cm to about $1 \times 10^{11}$ ohm-cm.

2. A semi-conductive, static-dissipative polymeric composite according to claim 1 wherein said particulate filler is selected from the group consisting of hollow or solid glass fibers, polymeric fibers, ceramic fibers, mica, carbon and graphite fibers, and crushed glass fillers.

3. A semi-conductive, static-dissipative, polymeric composite according to claim 1 wherein said filler comprises a glass filler having thereon an inorganic layer from 10 Å to 1000 Å of a highly conductive metal selected from the group consisting of stainless steel, and aluminum, and an overlayer of an insulative metal oxide, said layer having an average coating thickness of from 2 Å to 200 Å, the composites having volume resistivities of from $1 \times 10^4$ ohm-cm to $1 \times 10^{11}$ ohm-cm.

4. A semi-conductive, static-dissipative polymer composite according to claim 1 wherein said insulative polymeric resin is selected from the group consisting of epoxies, urethanes, polyesters, polycarbonates, polysulfones, polyethers, polyolefins, ethylene propylene copolymers, polypropylene-maleic acid anhydride, polystyrene, styrene-acrylonitrile copolymers, acrylonitrile-butadiene-styrene elastomers, poly(methyl methacrylate), ethylene vinyl acetate, ethylene-acrylic acid copolymers, vinyl chloride-polypropylene copolymers, polyisobutylene, polybutadiene, polyetheretherketone, polyetherimide, polyarylsulfone, and polypropylene oxide modified polyether sulfones.

5. A semi-conductive, static-dissipative polymer composite according to claim 4 wherein said insulative polymeric resin is selected from the group consisting of polycarbonates, polysulfones, styrene-acrylonitrile polymers, acrylonitrile-butadiene-styrene elastomers, and polypropylene oxide modified polyether sulfones.

6. A semi-conductive, static-dissipative polymeric composite according to claim 1 wherein said has a thin-film inorganic coating of from 50 Å to 500 Å.

7. A semi-conductive, static-dissipative polymeric composite according to claim 1 wherein said filler is selected from the group consisting of glass fibers, carbon fibers, and mica.

8. A process for making a static dissipative polymeric composite containing fillers having semi-conductive electrical properties, comprising the steps of:
   a) providing inorganic particulate filler having an aspect ratio of from about 1 to about 100 in a vacuum atmosphere,
   b) coating thereon a layer of highly conductive metal, said layer being from 10 to 1000 Å,
   c) introducing oxygen into said atmosphere in sufficient quantities and for sufficient time to cause said highly conductive metal to form an insulative metal oxide layer, said layer being from 2 Å to 200 Å in thickness, and
   d) incorporating said inorganic particulate filler into a polymeric matrix selected from the group consisting of epoxies, urethanes, polyesters, polycarbonates, polysulfones, polyethers, polyolefins, ethylene propylene copolymers, polypropylene-maleic acid anhydride, polystyrene, styrene-acrylonitrile copolymers, acrylonitrile-butadiene-styrene elastomers, poly(methyl methacrylate), ethylene vinyl acetate, ethylene-acrylic acid copolymers, vinyl chloride-propylene copolymers, polyisobutylene, polybutadiene, and polypropylene oxide modified polyether sulfones.

9. A process for making a static dissipative polymeric composite containing high aspect ratio fillers having semi-conductive electrical properties, comprising the steps of:
   a) providing high aspect inorganic particulate filler having an aspect ratio of from about 1 to about 100 in a vacuum atmosphere,
   b) coating thereon a layer of highly conductive metal, said layer being from 10 to 1000 Å,
   c) overcoating thereon an insulative metal oxide layer, said layer having an average coating thickness of from 2 Å to 200 Å in thickness, and
   d) incorporating said inorganic particulate filler at a volume loading of from 5 to 35 volume percent into a polymeric matrix selected from the group consisting of epoxies, urethanes, polyesters, polycarbonates, polysulfones, polyethers, polyolefins, ethylene propylene polystyrene, styrene-acrylonitrile copolymers, acrylonitrile-butadiene-styrene elastomers, poly(methyl methacrylate), ethylene vinyl acetate, propylene copolymers, polyisobutylene, polybutadiene, and polypropylene oxide modified polyether sulfones.

* * * * *

UNITED STATES PATENT AND TRADEMARK OFFICE
CERTIFICATE OF CORRECTION

PATENT NO. : 5,409,968
DATED : April 25, 1995
INVENTOR(S) : William J. Clatanoff, et al.

It is certified that error appears in the above-indentified patent and that said Letters Patent is hereby corrected as shown below:

On the title page:

Item [56], under "References Cited", the date for U.S. Patent No. 3,576,378 should be --4/1971--.

On the title page, under "Other Publications", "U.S. Ser. No. 07/94/868" should read --07/941868--.

Column 4, Line 22, delete the "a" before --insulative--.

Column 5, Line 61, "sheet of1" should read --sheet of 1--.

Column 10, Line 6, after "wherein said" insert --filler--.

Signed and Sealed this

Sixteenth Day of July, 1996

Attest:

BRUCE LEHMAN

Attesting Officer        Commissioner of Patents and Trademarks